United States Patent
Song et al.

(10) Patent No.: US 11,962,334 B2
(45) Date of Patent: Apr. 16, 2024

(54) METHOD AND APPARATUS FOR TRANSFERRING LARGE AMOUNT OF DATA IN MACHINE TO MACHINE SYSTEM

(71) Applicants: Hyundai Motor Company, Seoul (KR); Kia Corporation, Seoul (KR); Industry Academy Cooperation Foundation Of Sejong University, Seoul (KR)

(72) Inventors: Jae Seung Song, Seoul (KR); Min Byeong Lee, Gyeonggi-do (KR)

(73) Assignees: Hyundai Motor Company, Seoul (KR); Kia Corporation, Seoul (KR); Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 17/743,693

(22) Filed: May 13, 2022

(65) Prior Publication Data
US 2022/0368346 A1 Nov. 17, 2022

Related U.S. Application Data

(60) Provisional application No. 63/188,064, filed on May 13, 2021.

(51) Int. Cl.
| H04L 12/70 | (2013.01) |
| H03M 7/30 | (2006.01) |
| H04W 4/70 | (2018.01) |

(52) U.S. Cl.
CPC ........... *H03M 7/3068* (2013.01); *H04W 4/70* (2018.02)

(58) Field of Classification Search
CPC ............ H03M 7/3068; H03M 7/6052; H04W 4/70; H04L 63/0807; H04L 63/10; H04L 67/60; H04L 67/12; H04L 69/04
USPC ........................................................ 709/247
See application file for complete search history.

(56) References Cited

U.S. PATENT DOCUMENTS

| 6,311,294 | B1* | 10/2001 | Larky | G06F 13/24 710/63 |
| 9,262,094 | B2* | 2/2016 | Kisley | G06F 3/0619 |
| 9,842,001 | B2* | 12/2017 | Drahzal | G06F 9/5072 |
| 11,308,687 | B1* | 4/2022 | Liang | G06F 3/0488 |
| 2003/0147350 | A1* | 8/2003 | Wookey | H04L 67/56 370/231 |
| 2010/0095021 | A1* | 4/2010 | Samuels | H04L 47/70 709/235 |
| 2010/0198999 | A1* | 8/2010 | Nair | G06F 13/4282 710/33 |

(Continued)

*Primary Examiner* — Lance Leonard Barry
*Assistant Examiner* — Elizabeth Kassa

(57) ABSTRACT

Embodiments of the present disclosure are directed to forwarding a large amount of data in a machine-to-machine (M2M) system, and a method for operating a first device may include: transmitting, to a second device, a request message for bulk data transfer; and receiving, from the second device, an acknowledgment message for notifying completion of the bulk data transfer, wherein the request message may include at least one of information for identifying data to be included in bulk data, information on a target common service entity (CSE) in a target platform that receives the bulk data, information for indicating processing of source data after the bulk data transfer, and information for accessing the target CSE.

14 Claims, 8 Drawing Sheets

(56) References Cited

U.S. PATENT DOCUMENTS

| | | | |
|---|---|---|---|
| 2011/0238781 A1* | 9/2011 | Okun | H04L 67/06 |
| | | | 709/217 |
| 2016/0246722 A1* | 8/2016 | Bonanno | G06F 11/3037 |
| 2017/0004153 A1* | 1/2017 | Carter | G06F 3/0682 |
| 2017/0214702 A1* | 7/2017 | Moscovici | H04W 12/106 |
| 2017/0214759 A1* | 7/2017 | Timiskov | H04L 67/56 |
| 2018/0234908 A1* | 8/2018 | Di Girolamo | H04L 41/5058 |
| 2018/0249479 A1* | 8/2018 | Cho | H04W 12/086 |
| 2019/0173970 A1* | 6/2019 | Zhong | H04L 67/565 |
| 2019/0310954 A1* | 10/2019 | Chen | G06F 3/0664 |
| 2020/0120464 A1* | 4/2020 | Kim | H04W 12/033 |
| 2021/0234917 A1* | 7/2021 | Joheb | H04L 67/1097 |
| 2022/0019354 A1* | 1/2022 | Zhang | G06F 3/0608 |
| 2022/0038560 A1* | 2/2022 | Kim | H04L 69/04 |
| 2022/0141309 A1* | 5/2022 | Wang | H04W 4/70 |
| | | | 709/226 |
| 2023/0328153 A1* | 10/2023 | Mladin | H04W 4/70 |
| | | | 709/226 |

* cited by examiner

METHOD AND APPARATUS FOR TRANSFERRING LARGE AMOUNT OF DATA IN MACHINE TO MACHINE SYSTEM

CROSS REFERENCE TO RELATED APPLICATION

The present application claims priority to a U.S. provisional application 63/118,064, filed May 13, 2021, the entire contents of which are incorporated herein for all purposes by this reference.

TECHNICAL FIELD

Embodiments of the present disclosure relate to a machine-to-machine (M2M) system and, more particularly, to a method and apparatus for transferring a large amount of data in an M2M system.

BACKGROUND

Recently, introduction of Machine-to-Machine (M2M) system has become active. An M2M communication may refer to a communication performed between machines without human intervention. M2M may refer to Machine Type Communication (MTC), Internet of Things (IoT) or Device-to-Device (D2D). In the following description, the term "M2M" is uniformly used for convenience of explanation, but embodiments of the present disclosure are not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security, and health.

SUMMARY

Embodiments of the present disclosure are directed to provide a method and apparatus for efficiently transferring a large amount of data in a machine-to-machine (M2M) system.

Embodiments of the present disclosure are directed to provide a method and apparatus for avoiding repetition of a procedure required to transfer a large amount of amount in an M2M system.

Embodiments of the present disclosure are directed to provide a method and apparatus for signaling information necessary to transfer a large amount of data in an M2M system.

According to an exemplary embodiment of the present disclosure, a method for operating a first device in a machine-to-machine (M2M) system may include: transmitting, to a second device, a request message for bulk data transfer; and receiving, from the second device, an acknowledgment message for notifying completion of the bulk data transfer, wherein the request message may include at least one of information for identifying data to be included in bulk data, information on a target common service entity (CSE) in a target platform that receives the bulk data, information for indicating processing of source data after the bulk data transfer, and information for accessing the target CSE.

According to an exemplary embodiment of the present disclosure, a method for operating a second device in a machine-to-machine (M2M) system may include: receiving, from a first device, a first request message for a bulk data transfer; transmitting, to a third device, a second request message for requesting to allow the bulk data transfer; receiving, from the third device, a response message for indicating that the bulk data transfer is allowed, which corresponds to the second request message; transmitting bulk data to the third device; and receiving an acknowledgment message for notifying completion of the bulk data transfer.

According to an exemplary embodiment of the present disclosure, a method for operating a third device in a machine-to-machine (M2M) system may include: receiving, from a second device, a request message for requesting to allow a bulk data transfer requested by a first device; transmitting, to the second device, a response message for indicating that the bulk data transfer is allowed, which corresponds to the request message; and receiving bulk data from the second device and storing the bulk data.

According to an exemplary embodiment of the present disclosure, a first device in a machine-to-machine (M2M) system may include a transceiver and a processor coupled with the transceiver, wherein the processor may be configured to transmit, to a second device, a request message for bulk data transfer and receive, from the second device, an acknowledgment message for notifying completion of the bulk data transfer, and wherein the request message may include at least one of information for identifying data to be included in bulk data, information on a target common service entity (CSE) in a target platform that receives the bulk data, information for indicating processing of source data after the bulk data transfer, and information for accessing the target CSE.

According to an exemplary embodiment of the present disclosure, a second device in a machine-to-machine (M2M) system may include a transceiver and a processor coupled with the transceiver, wherein the processor may be configured to receive, from a first device, a first request message for a bulk data transfer, transmit, to a third device, a second request message for requesting to allow the bulk data transfer, receive, from the third device, a response message for indicating that the bulk data transfer is allowed, which corresponds to the second request message, to transmit bulk data to the third device, and to receive an acknowledgment message for notifying completion of the bulk data transfer.

According to an exemplary embodiment of the present disclosure, a third device in a machine-to-machine (M2M) system may include a transceiver and a processor coupled with the transceiver, wherein the processor may be configured to receive, from a second device, a request message for requesting to allow a bulk data transfer requested by a first device, transmit, to the second device, a response message for indicating that the bulk data transfer is allowed, which corresponds to the request message, and receive bulk data from the second device and store the bulk data.

According to embodiments of the present disclosure, a large amount of data may be effectively transferred in a machine-to-machine (M2M) system.

Effects obtained in embodiments of the present disclosure are not limited to the above-mentioned effects, and other effects not mentioned above may be clearly understood by those skilled in the art from the following description.

As discussed, the apparatus and methods suitably include use of a controller or processer.

In another aspect, vehicles are provided that comprise an apparatus and/or method as disclosed herein.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
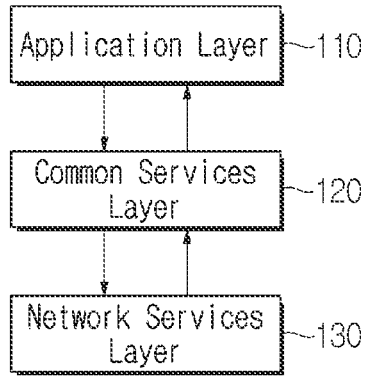
FIG. 1 illustrates a layered structure of a machine-to-machine (M2M) system according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence, or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller, or the like. Examples of computer readable media include, but are not limited to, ROM, RAM, compact disc (CD)-ROMs, magnetic tapes, floppy disks, flash drives, smart cards, and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In embodiments of the present disclosure, the terms first, second, etc. are used only for the purpose of distinguishing one component from another, and do not limit the order or importance of components, etc. unless specifically stated otherwise. Thus, within the scope of this disclosure, a first component in one embodiment may be referred to as a second component in another embodiment, and similarly a second component in one embodiment may be referred to as a first component.

In embodiments of the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In embodiments of the present disclosure, components that are distinguished from each other are intended to clearly illustrate each feature. However, it does not necessarily mean that the components are separate. In other words, a plurality of components may be integrated into one hardware or software unit, or a single component may be distributed into a plurality of hardware or software units. Thus, unless otherwise noted, such integrated or distributed embodiments are also included within the scope of embodiments of the present disclosure.

In embodiments of the present disclosure, components described in the various embodiments are not necessarily essential components, and some may be optional components. Accordingly, embodiments consisting of a subset of the components described in one embodiment are also included within the scope of embodiments of the present disclosure. Also, exemplary embodiments that include other components in addition to the components described in the various exemplary embodiments are also included in the scope of embodiments of the present disclosure.

In the following description of the embodiments of the present disclosure, a detailed description of known functions and configurations incorporated herein will be omitted when it may make the subject matter of embodiments of the present disclosure rather unclear. Parts not related to the description of embodiments of the present disclosure in the drawings are omitted, and like parts are denoted by similar reference numerals.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

In addition, the present specification describes a network based on Machine-to-Machine (M2M) communication, and a work in M2M communication network may be performed in a process of network control and data transmission in a system managing the communication network. In the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the exemplary embodiment described above.

In addition, an M2M terminal may be fixed or have mobility. An M2M server refers to a server for M2M communication and may be a fixed station or a mobile station. In the present specification, an entity may refer to hardware like M2M device, M2M gateway and M2M server. In addition, for example, an entity may be used to refer to software configuration in a layered structure of M2M system and is not limited to the embodiment described above.

In addition, for example, embodiments of the present disclosure mainly describe an M2M system but is not solely applied thereto. In addition, an M2M server may be a server that performs communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other through an M2M gateway. Herein, for example, both an M2M gateway and an M2M server may be M2M terminals and are not limited to the embodiment described above.

Embodiments of the present disclosure relate to a method and device for transferring a large amount of data in a machine-to-machine (M2M) system. More particularly, embodiments of the present disclosure describe a technique for uniformly using or transmitting data distributed in a plurality of resources in an M2M system.

oneM2M is a de facto standards organization that was founded to develop a communal IoT service platform sharing and integrating application service infrastructure (platform) environments beyond fragmented service platform development structures limited to separate industries like energy, transportation, national defense and public service. oneM2M aims to render requirements for things to things communication and IoT technology, architectures, Application Program Interface (API) specifications, security solutions and interoperability. For example, the specifications of oneM2M provide a framework to support a variety of applications and services such as smart cities, smart grids, connected cars, home automation, security, and health. In this regard, oneM2M has developed a set of standards defining a single horizontal platform for data exchange and sharing among all the applications. Applications across different industrial sections may also be considered by oneM2M. Like an operating system, oneM2M provides a framework connecting different technologies, thereby creating distributed software layers facilitating unification. Distributed software layers are implemented in a common services layer between M2M applications and communication Hardware/Software (HW/SW) rendering data transmission. For example, a common services layer may be a part of a layered structure illustrated in FIG. 1.

FIG. 1 is a view illustrating a layered structure of a Machine-to-Machine (M2M) system according to embodiments of the present disclosure. Referring to FIG. 1, a layered structure of an M2M system may include an application layer 110, a common services layer 120 and a network services layer 130. Herein, the application layer 110 may be a layer operating based on a specific application. For example, an application may be a fleet tracking application, a remote blood sugar monitoring application, a power metering application, or a controlling application. In other words, an application layer may a layer for a specific application. Herein, an entity operating based on an application layer may be an application entity (AE).

The common services layer 120 may be a layer for a common service function (CSF). For example, the common services layer 120 may be a layer for providing common services like data management, device management, M2M service subscription management and location service. For example, an entity operating based on the common services layer 120 may be a common service entity (CSE).

The common services layer 120 may provide a set of services that are grouped into CSFs according to functions. A multiplicity of instantiated CSFs constitutes CSEs. CSEs may interface with applications (for example, application entities or AEs in the terminology of oneM2M), other CSEs and base networks (for example, network service entities or NSEs in the terminology of oneM2M). The network services layer 130 may provide the common services layer 120 with services such as device management, location service and device triggering. Herein, an entity operating based on the network layer 130 may be a network service entity (NSE).

Figure 2:
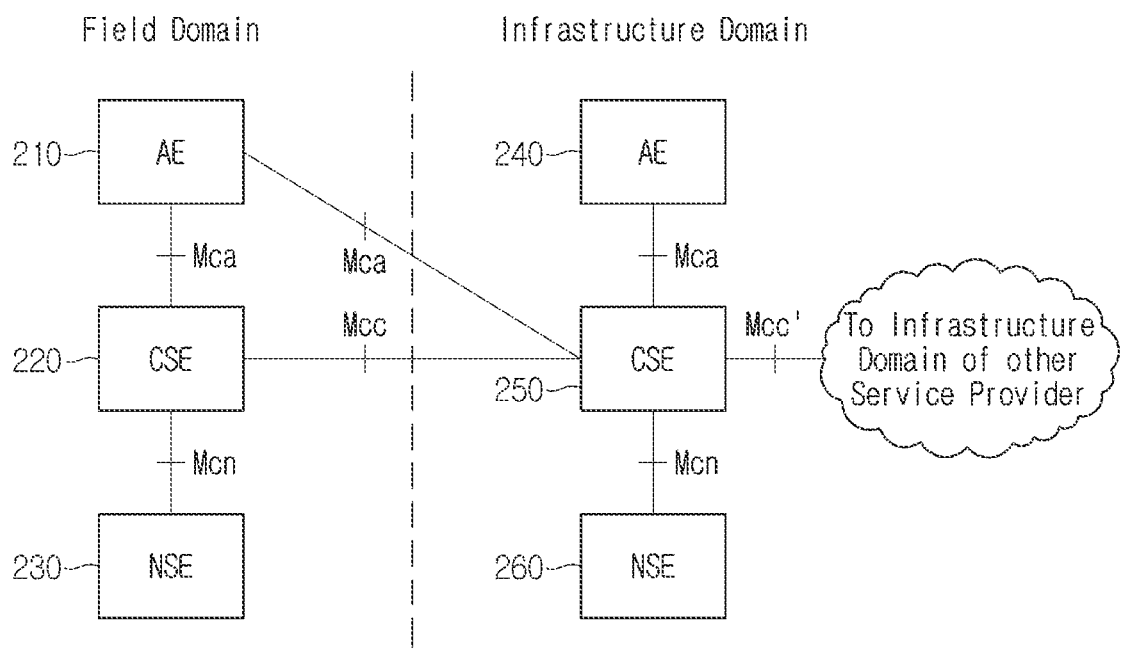
FIG. 2 illustrates a reference point in an M2M system according to embodiments of the present disclosure.

FIG. 2 is a view illustrating reference points in an M2M system according to embodiments of the present disclosure. Referring to FIG. 2, an M2M system structure may be distinguished into a field domain and an infrastructure domain. Herein, in each domain, each of the entities may perform communication through a reference point (for example, Mca or Mcc). For example, a reference point may indicate a communication flow between each entity. In particular, referring to FIG. 2, the reference point Mca between AE 210 or 240 and CSE 220 or 250, the reference point Mcc between different CSEs and Mcn reference point between CSE 220 or 250 and NSE 230 or 260 may be set.

Figure 3:
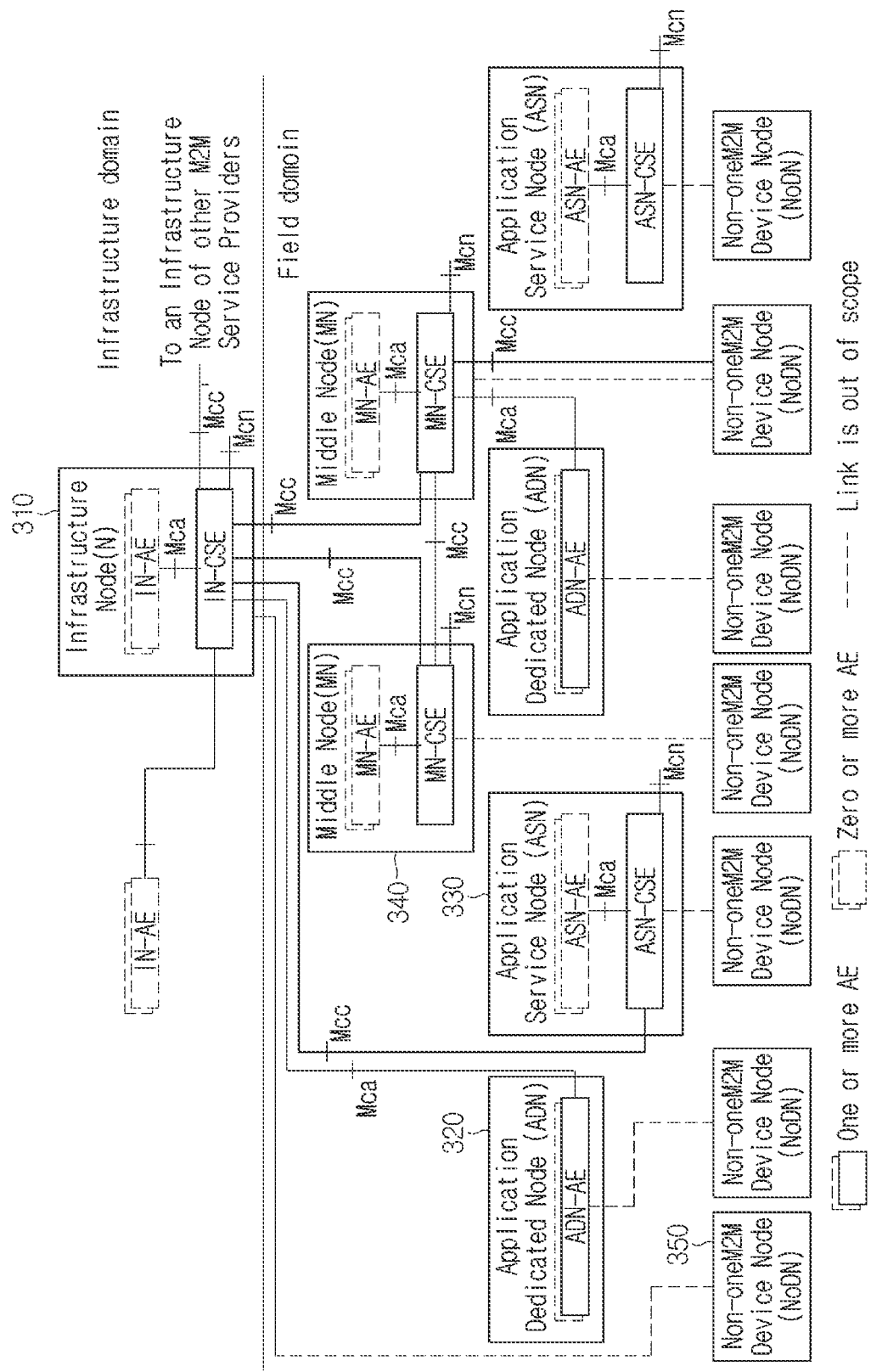
FIG. 3 illustrates each node in an M2M system according to embodiments of the present disclosure.

FIG. 3 is a view illustrating each node in an M2M system according to embodiments of the present disclosure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node that performs communication with the M2M terminal of another infrastructure based on an infrastructure structure. In addition, for example, conceptually, a node may be a logical entity or a software configuration.

Next, an application dedicated node (ADN) 320 may be a node including at least one AE but not CSE. In particular, an ADN may be set in the field domain. In other words, an ADN may be a dedicated node for AE. For example, an ADN may be a node that is set in an M2M terminal in hardware. In addition, the application service node (ASN) 330 may be a node including one CSE and at least one AE. ASN may be set in the field domain. In other words, it may be a node including AE and CSE. In particular, an ASN may be a node connected to an IN. For example, an ASN may be a node that is set in an M2M terminal in hardware.

In addition, a middle node (MN) 340 may be a node including a CSE and including zero or more AEs. In particular, the MN may be set in the field domain. An MN may be connected to another MN or IN based on a reference point. In addition, for example, an MN may be set in an M2M gateway in hardware. As an example, a non-M2M terminal node 350 (Non-M2M device node, NoDN) is a node that does not include M2M entities. It may be a node that performs management or collaboration together with an M2M system.

Figure 4:
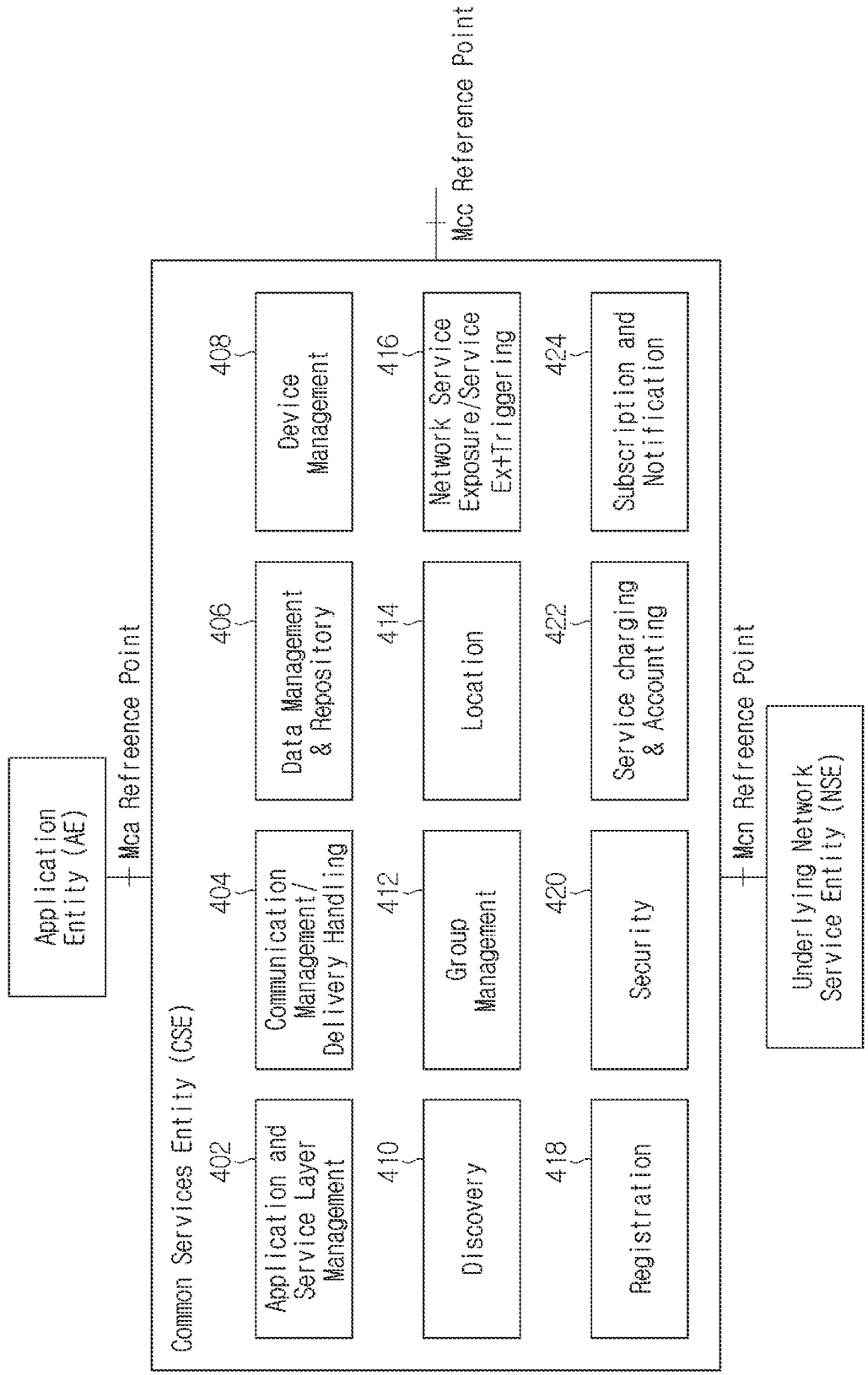
FIG. 4 illustrates a common service function in an M2M system according to embodiments of the present disclosure.

FIG. 4 is a view illustrating a common service function in an M2M system according to embodiments of the present disclosure. Referring to FIG. 4, common service functions may be provided. For example, a common service entity may provide at least one or more CSFs among application and service layer management 402, communication management and delivery handling 404, data management and repository 406, device management 408, discovery 410, group management 412, location 414, network service exposure/service execution and triggering 416, registration 418, security 420, service charging and accounting 422, service session management and subscription/notification 424. At this time, M2M terminals may operate based on a common service function. In addition, a common service function may be possible in other embodiments and is not limited to the above-described exemplary embodiment.

The application and service layer management 402 CSF provides management of AEs and CSEs. The application and service layer management 402 CSF includes not only the configuring, problem solving and upgrading of CSE functions but also the capability of upgrading AEs. The communication management and delivery handling 404 CSF provides communications with other CSEs, AEs and NSEs. The communication management and delivery handling 404 CSF are configured to determine at what time and through what connection communications are to be delivered, and also determine to buffer communication requests to deliver the communications later, if necessary and permitted.

The data management and repository 406 CSF provides data storage and transmission functions (for example, data collection for aggregation, data reformatting, and data storage for analysis and sematic processing). The device management 408 CSF provides the management of device capabilities in M2M gateways and M2M devices.

The discovery 410 CSF is configured to provide an information retrieval function for applications and services based on filter criteria. The group management 412 CSF provides processing of group-related requests. The group management 412 CSF enables an M2M system to support bulk operations for many devices and applications. The location 414 CSF is configured to enable AEs to obtain geographical location information.

The network service exposure/service execution and triggering 416 CSF manages communications with base networks for access to network service functions. The registration 418 CSF is configured to provide AEs (or other remote CSEs) to a CSE. The registration 418 CSF allows AEs (or remote CSE) to use services of CSE. The security 420 CSF is configured to provide a service layer with security functions like access control including identification, authentication, and permission. The service charging and accounting 422 CSF is configured to provide charging functions for a service layer. The subscription/notification 424 CSF is configured to allow subscription to an event and notifying the occurrence of the event.

Figure 5:
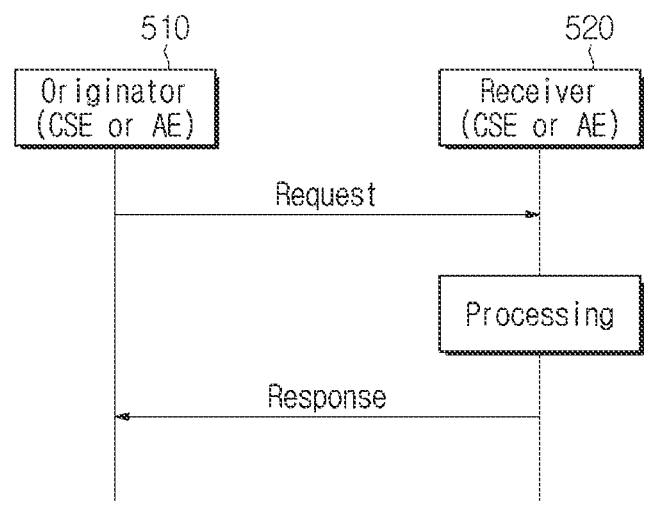
FIG. 5 illustrates a method in which an originator and a receiver exchange a message in an M2M system according to embodiments of the present disclosure.

FIG. 5 is a view illustrating that an originator and a receiver exchange a message in an M2M system according to embodiments of the present disclosure. Referring to FIG. 5, the originator 510 may be configured to transmit a request message to the receiver 520. In particular, the originator 510 and the receiver 520 may be the above-described M2M terminals. However, the originator 510 and the receiver 520 are not limited to M2M terminals but may be other terminals. They are not limited to the above-described exemplary embodiment. In addition, for example, the originator 510 and the receiver 520 may be nodes, entities, servers, or gateways, which are described above. In other words, the originator 510 and the receiver 520 may be hardware or software configurations and are not limited to the above-described embodiment.

Herein, for example, a request message transmitted by the originator 510 may include at least one parameter. Additionally, a parameter may be a mandatory parameter or an optional parameter. For example, a parameter related to a transmission terminal, a parameter related to a receiving terminal, an identification parameter and an operation parameter may be mandatory parameters. In addition, optional parameters may be related to other types of information. In particular, a transmission terminal-related parameter may be a parameter for the originator 510. In addition, a receiving terminal-related parameter may be a parameter for the receiver 520. An identification parameter may be a parameter required for identification of each other.

Further, an operation parameter may be a parameter for distinguishing operations. For example, an operation parameter may be set to any one among Create, Retrieve, Update, Delete and Notify. In other words, the parameter may aim to distinguish operations. In response to receiving a request message from the originator 510, the receiver 520 may be configured to process the message. For example, the receiver 520 may be configured to perform an operation included in a request message. For the operation, the receiver 520 may be configured to determine whether a parameter is valid and authorized. In particular, in response to determining that a parameter is valid and authorized, the receiver 520 may be configured to check whether there is a requested resource and perform processing accordingly.

For example, in case an event occurs, the originator 510 may be configured to transmit a request message including a parameter for notification to the receiver 520. The receiver 520 may be configured to check a parameter for a notification included in a request message and may perform an operation accordingly. The receiver 520 may be configured to transmit a response message to the originator 510.

A message exchange process using a request message and a response message, as illustrated in FIG. 5, may be performed between AE and CSE based on the reference point Mca or between CSEs based on the reference point Mcc. In other words, the originator 510 may be AE or CSE, and the receiver 520 may be AE or CSE. According to an operation in a request message, such a message exchange process as illustrated in FIG. 5 may be initiated by either AE or CSE.

A request from a requestor to a receiver through the reference points Mca and Mcc may include at least one mandatory parameter and at least one optional parameter. In other words, each defined parameter may be either mandatory or optional according to a requested operation. For example, a response message may include at least one parameter among those listed in Table 1 below.

TABLE 1

Response message parameter/success or not

Response Status Code-successful, unsuccessful, ack
Request Identifier-uniquely identifies a Request message
Content-to be transferred
To-the identifier of the Originator or the Transit CSE that sent the corresponding non-blocking request
From-the identifier of the Receiver
Originating Timestamp-when the message was built
Result Expiration Timestamp-when the message expires
Event Category-what event category shall be used for the response message
Content Status
Content Offset
Token Request Information
Assigned Token Identifiers
Authorization Signature Request Information
Release Version Indicator-the oneM2M release version that this response message conforms to A filter criteria condition, which may be used in a request message or a response message, may be defined as in Table 2 and Table 3 below.

TABLE 2

| Condition tag | Multiplicity | Description |
| --- | --- | --- |
| Matching Conditions | | |
| createdBefore | 0 . . . 1 | The creationTime attribute of the matched resource is chronologically before the specified value. |
| createdAfter | 0 . . . 1 | The creationTime attribute of the matched resource is chronologically after the specified value. |
| modifiedSince | 0 . . . 1 | The lastModifiedTime attribute of the matched resource is chronologically after the specified value. |
| unmodifiedSince | 0 . . . 1 | The lastModifiedTime attribute of the matched resource is chronologically before the specified value. |
| stateTagSmaller | 0 . . . 1 | The stateTag attribute of the matched resource is smaller than the specified value. |
| stateTagBigger | 0 . . . 1 | The stateTag attribute of the matched resource is bigger than the specified value. |
| expireBefore | 0 . . . 1 | The expirationTime attribute of the matched resource is chronologically before the specified value. |
| expireAfter | 0 . . . 1 | The expirationTime attribute of the matched resource is chronologically after the specified value. |
| labels | 0 . . . 1 | The labels attribute of the matched resource matches the specified value. |
| labelsQuery | 0 . . . 1 | The value is an expression for the filtering of labels attribute of resource when it is of key-value pair format. The expression is about the relationship between label-key and label-value which may include equal to or not equal to, within or not within a specified set etc. For example, label-key equals to label value, or label-key within {label-value1, label-value2}. Details are defined in [3] |
| childLabels | 0 . . . 1 | A child of the matched resource has labels attributes matching the specified value. The evaluation is the same as for the labels attribute above. Details are defined in [3]. |
| parentLabels | 0 . . . 1 | The parent of the matched resource has labels attributes matching the specified value. The evaluation is the same as for the labels attribute above. Details are defined in [3]. |

TABLE 2-continued

| Condition tag | Multiplicity | Description |
| --- | --- | --- |
| resourceType | 0 . . . n | The resourceType attribute of the matched resource is the same as the specified value. It also allows differentiating between normal and announced resources. |
| childResourceType | 0 . . . n | A child of the matched resource has the resourceType attribute the same as the specified value. |
| parentResourceType | 0 . . . 1 | The parent of the matched resource has the resourceType attribute the same as the specified value. |
| sizeAbove | 0 . . . 1 | The contentsize attribute of the <contentInstance> matched resource is equal to or greater than the specified value. |
| sizeBelow | 0 . . . 1 | The contentsize attribute of the <contentInstance> matched resource is smaller than the specified value. |
| contentType | 0 . . . n | The contentInfo attribute of the <contentInstance> matched resource matches the specified value. |
| attribute | 0 . . . n | This is an attribute of resource types (clause 9.6). Therefore, a real tag name is variable and depends on its usage and the value of the attribute can have wild card *. E.g. creator of container resource type can be used as a filter criteria tag as "creator = Sam", "creator = Sam*", "creator = *Sam". |
| childAttribute | 0 . . . n | A child of the matched resource meets the condition provided. The evaluation of this condition is similar to the attribute matching condition above. |
| parentAttribute | 0 . . . n | The parent of the matched resource meets the condition provided. The evaluation of this condition is similar to the attribute matching condition above. |
| semanticsFilter | 0 . . . n | Both semantic resource discovery and semantic query use semanticsFilter to specify a query statement that shall be specified in the SPARQL query language [5]. When a CSE receives a RETRIEVE request including a semanticsFilter, and the Semantic Query Indicator parameter is also present in the request, the request shall be processed as a semantic query; otherwise, the request shall be processed as a semantic resource discovery.<br>In the case of semantic resource discovery targeting a specific resource, if the semantic description contained in the <semanticDescriptor> of a child resource matches the semanticFilter, the URI of this child resource will be included in the semantic resource discovery result.<br>In the case of semantic query, given a received semantic query request and its query scope, the SPARQL query statement shall be executed over aggregated semantic information collected from the semantic resource(s) in the query scope and the produced output will be the result of this semantic query.<br>Examples for matching semantic filters in SPARQL to semantic descriptions can be found in [i.28]. |
| filterOperation | 0 . . . 1 | Indicates the logical operation (AND/OR) to be used for different condition tags. The default value is logical AND. |
| contentFilterSyntax | 0 . . . 1 | Indicates the Identifier for syntax to be applied for content-based discovery. |
| contentFilterQuery | 0 . . . 1 | The query string shall be specified when contentFilterSyntax parameter is present |

TABLE 3

| Condition tag | Multiplicity | Description |
| --- | --- | --- |
| | | Filter Handling Conditions |
| filterUsage | 0 . . . 1 | Indicates how the filter criteria is used. If provided, possible values are 'discovery' and 'IPEOnDemandDiscovery'.<br>If this parameter is not provided, the Retrieve operation is a generic retrieve operation and the content of the child resources fitting the filter criteria is returned.<br>If filterUsage is 'discovery', the Retrieve operation is for resource discovery (clause 10.2.6), i.e. only the addresses of the child resources are returned.<br>If filterUsage is 'IPEOnDemandDiscovery', the other filter conditions are sent to the IPE as well as the discovery Originator ID. When the IPE successfully generates new resources matching with the conditions, then the resource address(es) shall be returned. This value shall only be valid for the Retrieve request targeting an <AE> resource that represents the IPE. |
| limit | 0 . . . 1 | The maximum number of resources to be included in the filtering result. This may be modified by the Hosting CSE. When it is modified, then the new value shall be smaller than the suggested value by the Originator. |
| level | 0 . . . 1 | The maximum level of resource tree that the Hosting CSE shall perform the operation starting from the target resource (i.e. To parameter). This shall only be applied for Retrieve operation. The level of the target resource itself is zero and the level of the direct children of the target is one. |
| offset | 0 . . . 1 | The number of direct child and descendant resources that a Hosting CSE shall skip over and not include within a Retrieve response when processing a Retrieve request to a targeted resource. |
| applyRelativePath | 0 . . . 1 | This attribute contains a resource tree relative path (e.g. . . ./tempContainer/LATEST). This condition applies after all the matching conditions have been used (i.e. a matching result has been obtained). The attribute determines the set of resource(s) in the final filtering result. The filtering result is computed by appending the relative path to the path(s) in the |

TABLE 3-continued

| Condition tag | Multiplicity | Description |
|---|---|---|
| | | matching result. All resources whose Resource-IDs match that combined path(s) shall be returned in the filtering result. If the relative path does not represent a valid resource, the outcome is the same as if no match was found, i.e. there is no corresponding entry in the filtering result. |

A response to a request for accessing a resource through the reference points Mca and Mcc may include at least one mandatory parameter and at least one optional parameter. In other words, each defined parameter may be either mandatory or optional according to a requested operation or a mandatory response code. For example, a request message may include at least one parameter among those listed in Table 4 below.

announced for inclusion in an associated announced resource type. For each announced <resourceType>, the addition of suffix "Annc" to the original <resourceType> may be used to indicate its associated announced resource type. For example, resource <containerAnnc> may indicate the announced resource type for <container> resource, and <groupAnnc> may indicate the announced resource type for <group> resource.

TABLE 4

Request message parameter

| | |
|---|---|
| Mandatory | Operation-operation to be executed/CREAT, Retrieve, Update, Delete, Notify |
| | To-the address of the target resource on the target CSE |
| | From-the identifier of the message Originator |
| | Request Identifier-uniquely identifies a Request message |
| Operation dependent | Content-to be transferred |
| | Resource Type-of resource to be created |
| Optional | Originating Timestamp-when the message was built |
| | Request Expiration Timestamp-when the request message expires |
| | Result Expiration Timestamp-when the result message expires |
| | Operational Execution Time-the time when the specified operation is to be executed by the target CSE |
| | Response Type-type of response that shall be sent to the Originator |
| | Result Persistence-the duration for which the reference containing the responses is to persist |
| | Result Content-the expected components of the result |
| | Event Category-indicates how and when the system should deliver the message |
| | Delivery Aggregation-aggregation of requests to the same target CSE is to be used |
| | Group Request Identifier-Identifier added to the group request that is to be fanned out to each member of the group |
| | Group Request Target Members-indicates subset of members of a group |
| | Filter Criteria-conditions for filtered retrieve operation |
| | Desired Identifier Result Type-format of resource identifiers returned |
| | Token Request Indicator-indicating that the Originator may attempt Token Request procedure (for Dynamic Authorization) if initiated by the Receiver |
| | Tokens-for use in dynamic authorization |
| | Token IDs-for use in dynamic authorization |
| | Role IDs-for use in role based access control |
| | Local Token IDs-for use in dynamic authorization |
| | Authorization Signature Indicator-for use in Authorization Relationship Mapping |
| | Authorization Signature-for use in Authorization Relationship Mapping |
| | Authorization Relationship Indicator-for use in Authorization Relationship Mapping |
| | Semantic Query Indicator-for use in semantic queries |
| | Release Version Indicator-the oneM2M release version that this request message conforms to. |
| | Vendor Information |

A normal resource includes a complete set of representations of data constituting the base of information to be managed. Unless qualified as either "virtual" or "announced", the resource types in the present document are normal resources. A virtual resource is used to trigger processing and/or a retrieve result. However, a virtual resource does not have a permanent representation in a CSE. An announced resource contains a set of attributes of an original resource. When an original resource changes, an announced resource is automatically updated by the hosting CSE of the original resource. The announced resource contains a link to the original resource. Resource announcement enables resource discovery. An announced resource at a remote CSE may be used to create a child resource at a remote CSE, which is not present as a child of an original resource or is not an announced child thereof.

To support resource announcement, an additional column in a resource template may specify attributes to be When there is a need to transfer a large amount of data from an IoT platform to another IoT platform, a function that uses data compression, data blocking and buffering to optimize transfer rate is required. For example, let's consider a situation in which a user of a oneM2M service provider A wants to change the service provider to a service provide B. In case the amount of data belongs to the user is large, using CRUD (create, retrieve, update, delete) operations to all the data is not an effective way to perform. When the user's data is distributed to 100 AE resources and each AE resource contains 10,000 content Instances, a new oneM2M AE for the user in the service provider B has to perform a huge amount of CRUD operations. Also, an access control policy (ACP) check should also be done for each individual operation. Accordingly, there is a need to support a bulk data transfer between IoT platforms. Therefore, embodiments of the present disclosure describe various embodiments of supporting a bulk data transfer between oneM2M platforms.

Figure 6:
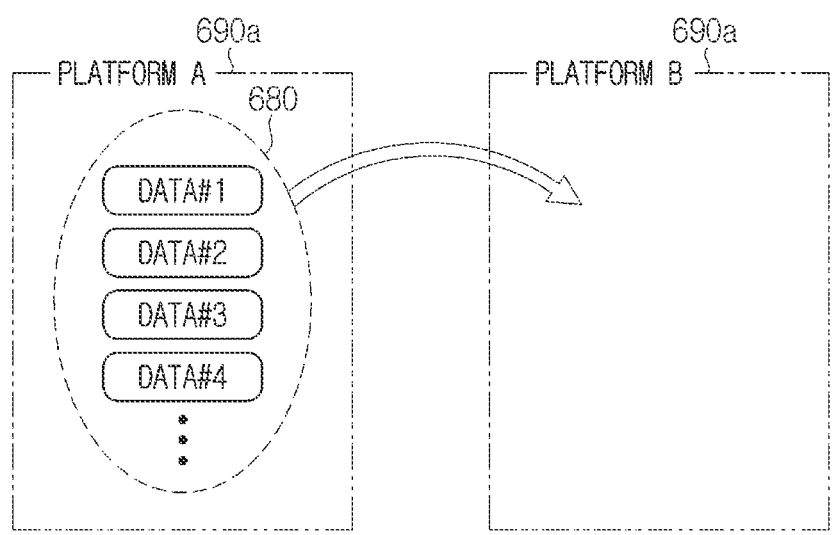
FIG. 6 illustrates an example of transferring data between platforms in an M2M system according to embodiments of the present disclosure.

FIG. 6 illustrates an example of transferring data between platforms in an M2M system according to embodiments of the present disclosure. Referring to FIG. 6, a data set 680 is transferred between two IoT platforms 690a and 690b. The data set 680 may include a large amount of data associated with a plurality of resources that belong to a specific AE.

The data set 680 between the platforms 690a and 690b may be transferred by various procedures. According to an exemplary embodiment, the data set 680 may be transferred in a procedure for selling a data set (e.g., open IoT data or AI data) to users. In this case, the platform A 690a may include an AE or a CSE for data sale, and the platform B 690b may include an AE of a data purchaser. According to another embodiment, the data set 680 may be transferred based on a user's changing a service provider. In this case, the platform A 690a and the platform B 690b are platforms which are operated by different service providers, and as a user, who possesses the data set 680 in the platform A 690a, changes a service provider, the data set 680 may be transferred to the platform B 690b which is operated by the changed service provider. According to yet another embodiment, when allowing a specific user of a service provider B to use a resource in a service provider A, the data set 680 may be transferred. In this case, the platform A 690a may be operated by the service provider A, and the platform B 690b may be operated by the service provider B.

As described with reference to FIG. 6, a large amount of data, that is, bulk data may be transferred between platforms according to one of various procedures. A bulk data transfer procedure according to various embodiments may be briefly described as follows.

An application sets up required information to perform a bulk data transfer. Next, the application requests the source CSE to perform the bulk data transfer for specified resources to the target CSE. Next, the source CSE prepares and performs the bulk data transfer. In addition, the target CSE receives the transferred bulk data and store it to proper places. Finally, the source CSE performs a remaining process (e.g., delete or keep the selected resources).

Figure 7:
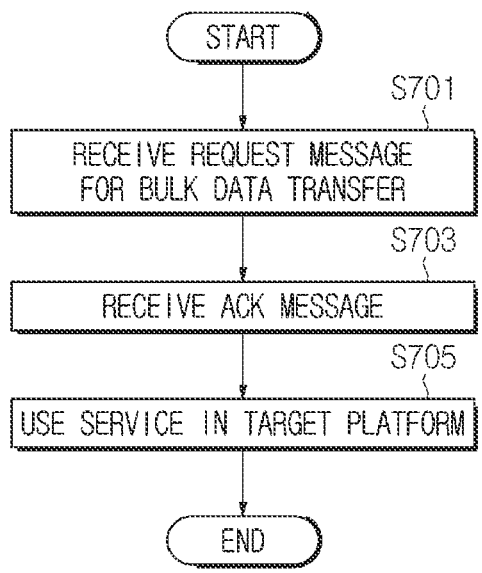
FIG. 7 illustrates an example of a procedure of requesting bulk data transfer in an M2M system according to embodiments of the present disclosure.

FIG. 7 illustrates an example of a procedure of requesting bulk data transfer in an M2M system according to embodiments of the present disclosure. FIG. 7 illustrates an operation method of a device in which an application using bulk data is executed.

Referring to FIG. 7, at step S701, the device transmits a request message for a bulk data transfer. That is, the device requests a source CSE in a source platform, which has bulk data to be transmitted, to transfer the bulk data. The request message may include information necessary for transferring the bulk data. For example, the request message may include at least one of information for identifying data to be included in the bulk data, information on a target CSE in a target platform receiving the bulk data, information for indicating processing of source data after the bulk data are transferred, and information for accessing the target CSE.

At step S703, the device receives an acknowledgment (ACK) message. That is, the device acknowledges a notification for notifying that the bulk data transfer is completed. At this time, according to another embodiment, the device may receive a message for notifying that the bulk data transfer fails or is rejected. In this case, the device may check a cause of the failure or rejection of the bulk data transfer and may request transfer of the bulk data again.

At step S705, the device uses a service in a target platform. That is, after accessing the target platform, the device may use a service based on bulk data which are transferred from a source platform. Accordingly, even when a serving platform is changed, continuity of a service provided by the source platform may be retained.

As in the embodiment described with reference to FIG. 7, in case a serving platform is changed by a change in service provider, the device may use data, which were used in the source platform, in the target platform through bulk data transfer. However, according to another embodiment, the step S705 may be skipped. For example, in case the device is not a subject using bulk data but a subject providing (e.g., selling) bulk data, a subject using the data may be another device. In this case, the device may receive a request to provide data from the another device and may request a bulk data transfer to a serving platform of the another platform.

Figure 8:
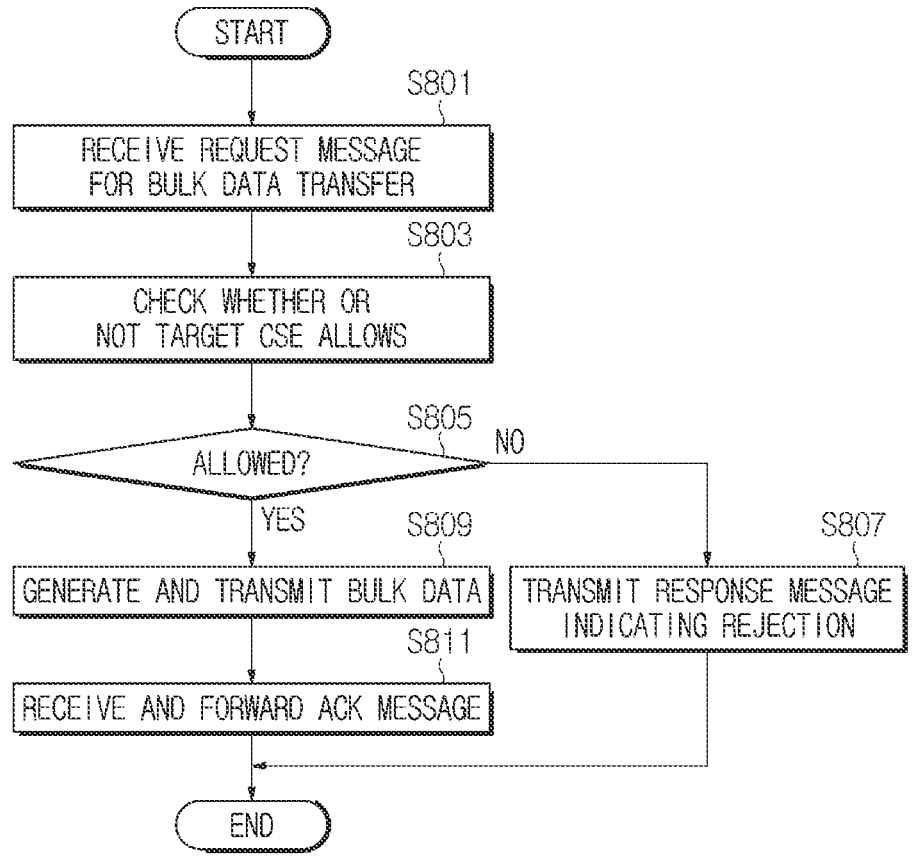
FIG. 8 illustrates an example of a procedure of transmitting bulk data in an M2M system according to embodiments of the present disclosure.

FIG. 8 illustrates an example of a procedure of transmitting bulk data in an M2M system according to embodiments of the present disclosure. FIG. 8 illustrates an operation method of a device (e.g., source CSE) that transmits bulk data.

Referring to FIG. 8, at step S801, the device receives a request message for a bulk data transfer. That is, the device receives a request for a transfer of bulk data from an AE that has the right for bulk data. The request message may include information necessary for transferring the bulk data. For example, the request message may include at least one of information for identifying data to be included in the bulk data, information on a target CSE in a target platform receiving the bulk data, information for indicating processing of source data after the bulk data are transferred, and information for accessing the target CSE.

At step S803, the device checks whether the target CSE allows or not. Specifically, the device may transmit a request message for requesting to allow the bulk data transfer to the target CSE and receive a response message corresponding to the request message. For example, the request message may include at least one of information accessing the target CSE and information on the bulk data (e.g., size, type, and form). The response message includes information regarding whether or not the bulk data transfer is allowed, that is, whether or not the target CSE of a target platform will receive the bulk data.

At step S805, the device checks whether or not the bulk data transfer is allowed. That is, the device checks whether the response message indicates that the bulk data transfer is allowed or rejected. When the response message indicates that the bulk data transfer is rejected, the response message may include information on a cause of rejection.

When the bulk data transfer is rejected, at step S807, the device transmits a response message for indicating rejection. In other words, the device notifies an AE requesting the bulk data transfer that the bulk data transfer is rejected by the target platform. In case the response message received from the target CSE includes information on the cause of rejection, the device may include the information on the cause of rejection in a response message transmitted to the AE.

When the bulk data transfer is allowed, at step S809, the device generates bulk data and transmits the bulk data. Specifically, the device may identify and collect target data based on information included in the request message received at step S801 and may generate a data block as bulk data. Herein, additionally, the device may reduce a size of the data block by compressing the bulk data.

At step S811, the device receives an ACK message and forwards the ACK message. In other words, the device receives, from the target CSE, the ACK message for notifying that the reception of the bulk data is completed and notifies the AE that the reception of the bulk data is completed. Next, based on information included in the request message received at step S801, the device may delete or retain data included in the bulk data.

Figure 9:
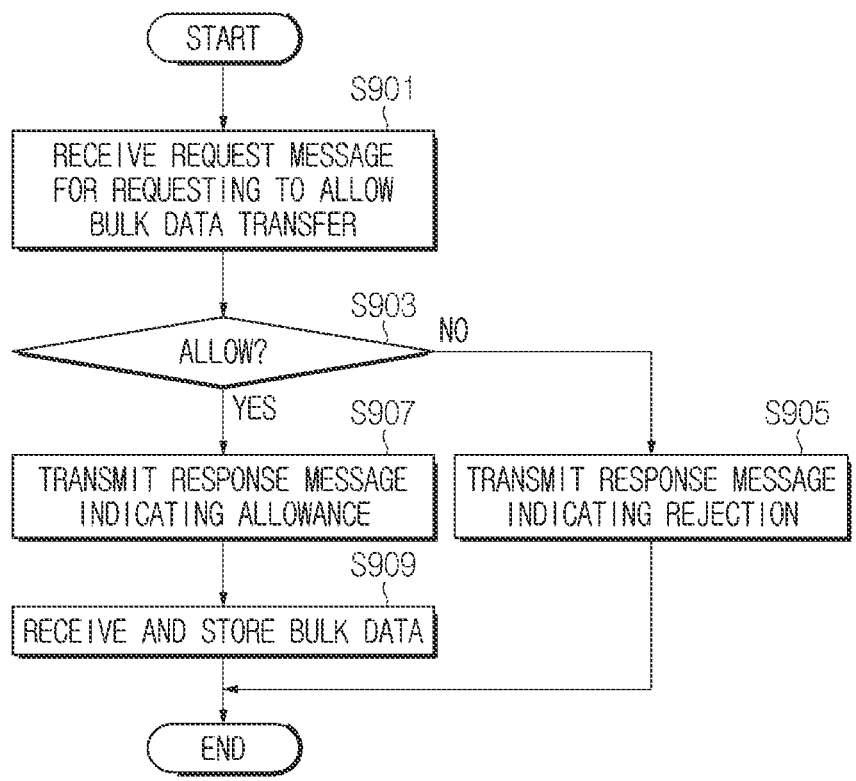
FIG. 9 illustrates an example of a procedure of receiving bulk data in an M2M system according to embodiments of the present disclosure.

FIG. 9 illustrates an example of a procedure of receiving bulk data in an M2M system according to embodiments of the present disclosure. FIG. 9 illustrates an operation method of a device (e.g., target CSE) that receives bulk data.

Referring to FIG. 9, at step S901, the device receives a request message for requesting to allow a bulk data transfer. The request message is received from a source CSE that receives a request for the transfer from an AE that has the right for bulk data. For example, the request message may include at least one of information for accessing a device and information on the bulk data (e.g., size, type, and form).

At step S903, the device determines whether or not to allow the bulk data transfer. Specifically, based on information included in the request message, the device may determine whether or not to allow the bulk data transfer based on whether or not to allow access to the source CSE, whether or not the bulk data are acceptable, whether or not a related service is supported, and whether or not there is a storage space available. For example, the device may identify a service related to data included in the bulk data based on the information included in the request message received at step S901 and may determine whether or not the identified service is supported in a platform to which the device belongs. In addition, based on the information included in the request message received at step S901, the device may authenticate access to the source CSE and determine whether or not valid access is possible.

When the bulk data transfer is rejected, at step S905, the device transmits a response message for indicating rejection. That is, the device notifies the source CSE that the bulk data transfer is rejected. According to an exemplary embodiment, the response message may include information on a cause of rejection.

When the bulk data transfer is allowed, at step S907, the device transmits a response message for indicating allowance. That is, the device notifies the source CSE that the bulk data transfer is allowed. In this case, the device may perform a preparatory operation for receiving and storing the bulk data. For example, the device may allocate a storage space for storing the bulk data and set information necessary to provide a service to an AE.

At step S909, the device receives and stores the bulk data. That is, the device receives a data block including the bulk data from the source CSE. In case the data block includes compressed bulk data, the device may decompress the bulk data and store the data block.

According to the above-described embodiments, a large amount of data may be transferred between platforms. In the above-described procedures, an AE generates information necessary for a bulk data transfer and requests the bulk data transfer by using the generated information. For example, the information necessary for the bulk data transfer may include at least one of the items listed in Table 5 below.

TABLE 5

| Items | Description |
| --- | --- |
| bulkSource | specifies the source of the bulk transfer using filter criteria. For example, resources under group A, resources belonging to user A, resources under open license, and purchased resources. |
| targetCSEID | specifies the URI of the target CSE. |
| transferMode | indicates delete option of bulk transfer source (e.g., 1: keep the source resources after the transfer, 2: delete the source resources after the successful transfer). |
| credentialTransfer | contains a credential to access target CSE. |

Information including items like those of Table 5 may be defined as <bulkTransfer> resource or attribute and may be included in a message which is transmitted from an AE to a CSE.

In order to support bulk data transfer according to various embodiments, a source CSE, a target CSE and a reference point mcc' between the source CSE and the target CSE may be designed to support the following functions. The source CSE may have at least one of the following functions: collect data by using information like in Table 5, that is, information included in <bulkTransfer>, make a block of resources including selected data, compress data collected based on information from the target CSE, transmit the compressed data to the target CSE, and delete or retain source data based on 'transferMode' information. The reference point mcc' may support a primitive which is defined for bulk data transfer. The target CSE may have one of the following functions to: understand a bulk transfer primitive, check ACP and/or license information to grant the requested bulk transfer, return necessary information to the source CSE to perform the bulk transfer (i.e., credential to compressed data, a compression scheme, etc.), decompress received bulk data, and store data to proper resources.

Figure 10:
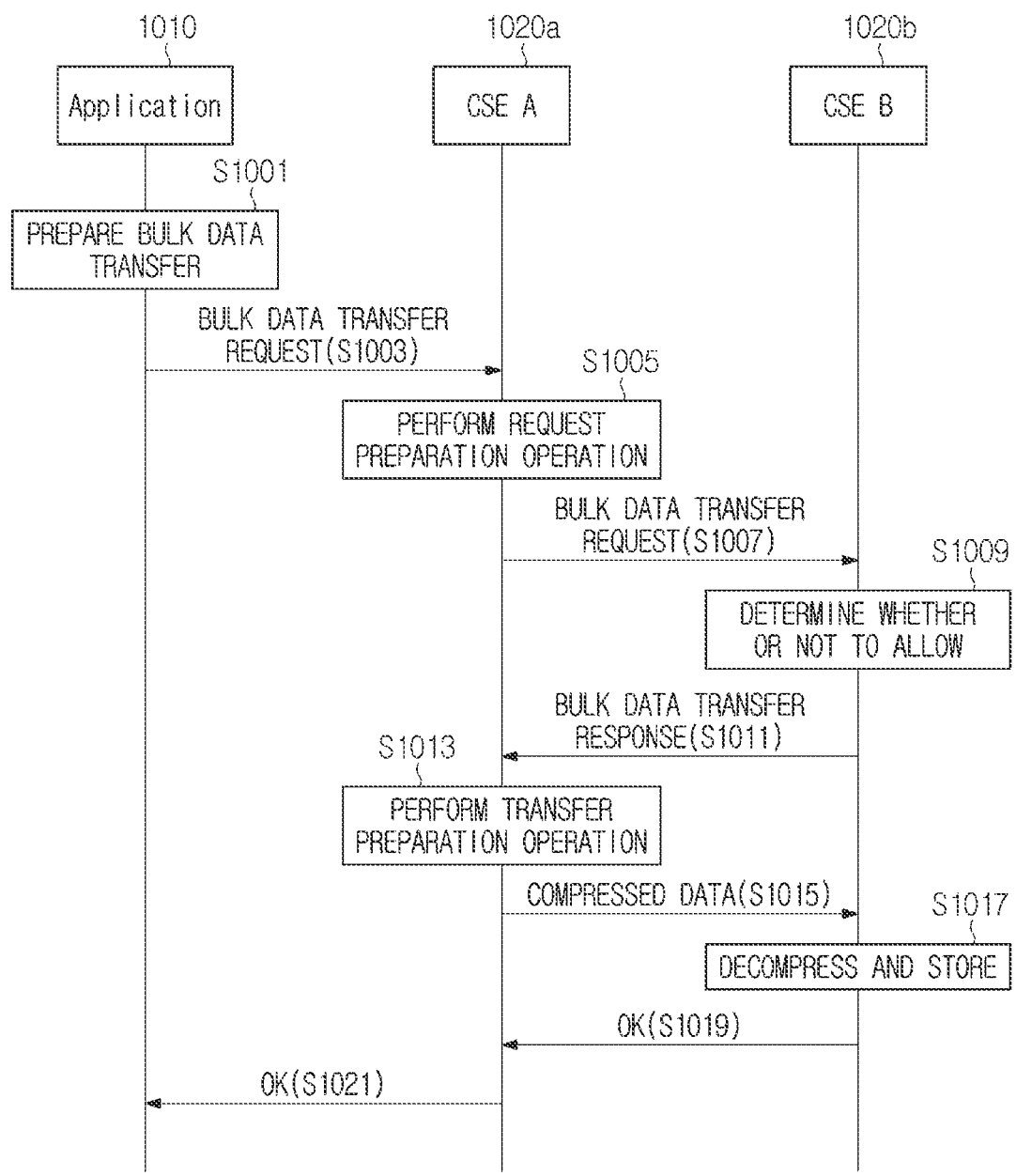
FIG. 10 illustrates an example of a procedure of transferring bulk data in an M2M system according to embodiments of the present disclosure.

FIG. 10 illustrates an example of a procedure of transferring bulk data in an M2M system according to embodiments of the present disclosure. FIG. 10 illustrates signal exchange among an application 1010 configured to request a bulk data transfer, a CSE A 1020a configured to transmit bulk data, and a CSE B 1020b configured to receive bulk data.

Referring to FIG. 10, at step S1001, the application 1010 prepares a bulk data transfer. Specifically, based on a user's command and a request from another device, the application 1010 may determine to perform the bulk data transfer and generate necessary information (e.g., <bulkTransfer>) for the bulk data transfer.

At step S1003, the application 1010 transmits a request message for the bulk data transfer to the CSE A 1020a. The request message may include the information generated at step S1001. Accordingly, the CSE A 1020a may obtain information associated with the bulk data transfer, which is requested by the application 1010, and confirm details of the bulk data transfer based on the obtained information.

At step S1005, the CSE A 1020a performs a preparatory operation for requesting the bulk data transfer. According to an exemplary embodiment, the CSE A 1020a may perform an ACP check, collect data belonging to the application 1010 and make a block of the collected data. According to another embodiment, data collection and blocking may be performed at step S1013 below.

At step S1007, the CSE A 1020a transmits a request message for the bulk data transfer to the CSE B 1020b. Herein, the request message may include the information received from the application 1010 at step S1003. The request message may be transmitted through the reference point mcc'.

At step S1009, the CSE B 1020b determines whether or not to allow the bulk data transfer. For example, the CSE B 1020b may perform an ACP check or a license check for the application 1010 or the CSE A 1020a. In this embodiment, the bulk data transfer is allowed.

At step S1011, the CSE B 1020b transmits a response message for the bulk data transfer to the CSE A 1020a. That is, the CSE B 1020b notifies the CSE A 1020a that the bulk data transfer is allowed. The response message may be transmitted through the reference point mcc'.

At step S1013, the CSE A 1020a performs a preparatory operation for transmitting bulk data. For example, the CSE A 1020a generates a data block to be transmitted as bulk data. Specifically, the CSE A 1020a searches information for compression, compresses collected data and prepares bulk transfer. Herein, the CSE A 1020a may check a compression-related capacity through signaling with the CSE B 1020b and may use a compression scheme supported by the CSE B 1020b.

At step S1015, the CSE A 1020a transmits compressed data to the CSE B 1020b. The compressed data includes data which are collected at step S1005 or at step S1013. That is, data collected at the request of the application 1010 may be transmitted by being compressed through a compression scheme agreed by signaling between the CSE A 1020a and the CSE B 1020b.

At step S1017, the CSE B 1020b decompresses the compressed data and stores the data. In other words, the CSE B 1020b restores the bulk data by decompressing the received data and then stores the restored data. Herein, the CSE B 1020b may store the data in a same structure as the one when the data were collected in the CSE A 1020a.

At step S1019, the CSE B 1020b transmits an OK message to the CSE A 1020a. That is, the CSE B 1020b notifies the CSE A 1020a that the data have been successfully stored.

At step S1021, the CSE A 1020a transmits an OK message to the application 1010. That is, the CSE A 1020a notifies the application 1010 that the bulk data transfer is completed.

Figure 11:
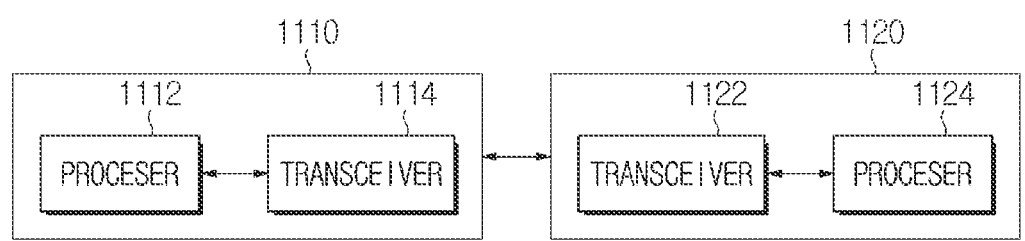
FIG. 11 illustrates a configuration of an M2M device in an M2M system according to embodiments of the present disclosure.

FIG. 11 illustrates a configuration of an M2M device in an M2M system according to embodiments of the present disclosure. An M2M device 1110 or an M2M device 1120 illustrated in FIG. 11 may be understood as hardware functioning as at least one among the above-described AE, CSE and NSE.

Referring to FIG. 11, the M2M device 1110 may include a processor 1112 controlling a device and a transceiver 1114 transmitting and receiving a signal. Herein, the processor 1112 may control the transceiver 1114. In addition, the M2M device 1110 may communicate with another M2M device 1120. The another M2M device 1120 may also include a processor 1122 and a transceiver 1124, and the processor 1122 and the transceiver 1124 may perform the same function as the processor 1112 and the transceiver 1114.

As an example, the originator, the receiver, AE and CSE, which are described above, may be one of the M2M devices 1110 and 1120 of FIG. 11, respectively. In addition, the devices 1110 and 1120 of FIG. 11 may be other devices. As an example, the devices 1110 and 1120 of FIG. 11 may be communication devices, vehicles, or base stations. That is, the devices 1110 and 1120 of FIG. 11 refer to devices capable of performing communication and are not limited to the above-described embodiment.

The above-described exemplary embodiments of the present disclosure may be implemented by various means. For example, the exemplary embodiments of the present disclosure may be implemented by hardware, firmware, software, or a combination thereof.

The foregoing description of the exemplary embodiments of the present disclosure has been presented for those skilled in the art to implement and perform the disclosure. While the foregoing description has been presented with reference to the preferred embodiments of the present disclosure, it will be apparent to those skilled in the art that various modifications and variations may be made in embodiments of the present disclosure without departing from the spirit or scope of embodiments of the present disclosure as defined by the following claims.

Accordingly, embodiments of the present disclosure are not intended to be limited to the exemplary embodiments shown herein but is to be accorded the widest scope consistent with the principles and novel features disclosed herein. In addition, while the exemplary embodiments of the present specification have been particularly shown and described, it is to be understood that the present specification is not limited to the above-described exemplary embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the disclosure and the method disclosure are explained, and the description of both inventions may be supplemented as necessary. In addition, embodiments of the present disclosure have been described with reference to exemplary embodiments thereof. It will be understood by those skilled in the art that various changes in form and details may be made therein without departing from the essential characteristics of embodiments of the present disclosure. Therefore, the disclosed exemplary embodiments should be considered in an illustrative sense rather than in a restrictive sense. The scope of embodiments of the present disclosure is defined by the appended claims rather than by the foregoing description, and all differences within the scope of equivalents thereof should be construed as being included in embodiments of the present disclosure.

What is claimed is:

1. A method for operating a first device in a machine-to-machine (M2M) system, the method comprising:
transmitting, to a second device, a request message requesting to transfer bulk data related to a resource to a third device; and
receiving, from the second device, an acknowledgment message for notifying completion of the bulk data transfer to the third device;
wherein the request message includes information for identifying source data to be transmitted as bulk data among data stored in the second device prior to transmission of the request message, and information on a target common service entity (CSE) that is the third device;

wherein the information identifying source data comprises filter criteria that specify the source data.

2. The method of claim 1, wherein the bulk data transfer is requested in response to one of a data purchase of another device, a change of a serving platform for the first device, and permission for the first device to use a resource in a platform to which the second device belongs.

3. The method of claim 1, wherein the request message further includes at least one of information for indicating deletion or maintenance of source data in the second device after the bulk data transfer, and information for accessing the target CSE.

4. A method for operating a second device in a machine-to-machine (M2M) system, the method comprising:
  receiving, from a first device, a first request message requesting to transmit bulk data related to a resource to a thrid device;
  transmitting, to the third device, a second request message for requesting to allow the bulk data transfer to the third device;
  receiving, from the third device, a response message for indicating that the bulk data transfer is allowed, which corresponds to the second request message;
  transmitting, to the third device, bulk data; and
  receiving an acknowledgment message for notifying completion of the bulk data transfer to third device,
  wherein the first and second request messages include information for identifying source data to be transmitted as the bulk data among data stored in the second device prior to transmission of the first and second request messages, and information on a target common service entity (CSE) that is the third device; and
  wherein the information identifying source data comprises filter criteria that specify the source data.

5. The method of claim 4, wherein the first request message further includes at least one of information for indicating deletion or maintenance of source data in the second device after the bulk data are transferred, and information for accessing the third device.

6. The method of claim 4, wherein the second request message includes at least one of information for accessing the third device and information on the bulk data.

7. The method of claim 4, further comprising:
  collecting data included in the bulk data; and
  compressing the collected data.

8. The method of claim 3, further comprising:
  determining a compression scheme for compressing the bulk data based on signaling with the third device.

9. The method of claim 4, further comprising:
  after transmitting the bulk data, deleting data in the bulk data from a platform to which the second device belongs.

10. A method for operating a third device in a machine-to-machine (M2M) system, the method comprising:
  receiving, from a second device, a request message for requesting to allow a bulk data transfer requested by a first device;
  transmitting, to the second device, a response message for indicating that the bulk data transfer is allowed, which corresponds to the request message; and
  receiving bulk data from the second device and storing the bulk data,
  wherein the response message includes information indicating a compression scheme for the bulk data.

11. The method of claim 10, wherein the request message includes at least one of information for accessing the third device and information on the bulk data.

12. The method of claim 11, wherein the information for accessing the third device includes credential information or license information for accessing the third device.

13. The method of claim 10, further comprising:
  determining whether or not allow the bulk data transfer based on the request message.

14. The method of claim 10,
  wherein the bulk data are received in a compressed state based on the compression scheme.

* * * * *